(12) United States Patent
Cirucci et al.

(10) Patent No.: US 10,954,825 B2
(45) Date of Patent: Mar. 23, 2021

(54) SYSTEM AND METHOD FOR CARBON DIOXIDE UPGRADE AND ENERGY STORAGE USING AN EJECTOR

(71) Applicant: ARIZONA BOARD OF REGENTS ON BEHALF OF ARIZONA STATE UNIVERSITY, Scottsdale, AZ (US)

(72) Inventors: John Frederick Cirucci, Schneckville, PA (US); Klaus Stephan Lackner, Paradise Valley, AZ (US)

(73) Assignee: Arizona Board of Regents on behalf of Arizona State University, Scottsdale, AZ (US)

(*) Notice: Subject to any disclaimer, the term of this patent is extended or adjusted under 35 U.S.C. 154(b) by 0 days.

(21) Appl. No.: 16/642,012

(22) PCT Filed: Aug. 29, 2018

(86) PCT No.: PCT/US2018/048550
§ 371 (c)(1),
(2) Date: Feb. 25, 2020

(87) PCT Pub. No.: WO2019/046430
PCT Pub. Date: Mar. 7, 2019

(65) Prior Publication Data
US 2020/0182095 A1    Jun. 11, 2020

Related U.S. Application Data

(60) Provisional application No. 62/551,738, filed on Aug. 29, 2017.

(51) Int. Cl.
*F01K 25/10*    (2006.01)
*F01K 3/12*    (2006.01)
(Continued)

(52) U.S. Cl.
CPC .............. *F01K 25/103* (2013.01); *F01K 3/12* (2013.01); *F22B 1/02* (2013.01); *F28D 20/0034* (2013.01); *F28D 20/02* (2013.01)

(58) Field of Classification Search
CPC ..................................................... F01K 25/103
See application file for complete search history.

(56) References Cited

U.S. PATENT DOCUMENTS

| 4,765,143 A | 8/1988 | Crawford et al. |
| 4,843,823 A * | 7/1989 | Freedman ............... F01K 23/04 |
| | | 60/649 |

(Continued)

FOREIGN PATENT DOCUMENTS

| GB | 1163541 A * | 9/1969 | ............. F01K 19/08 |
| WO | 2012/168472 A2 | 12/2012 | |

(Continued)

OTHER PUBLICATIONS

U.S. Department of Energy, "Grid Energy Storage" [online], Energy.gov, Dec. 2013 [retrieved on Sep. 3, 2020 from archive.org, as it appeared on May 6, 2017], retrieved from the Internet <https://web.archive.org/web/20170526161646/https://energy.gov/sites/prod/files/2014/09/f18/Grid%20Energy%20Storage%20December%202013.pdf>.

(Continued)

*Primary Examiner* — Laert Dounis
(74) *Attorney, Agent, or Firm* — Rodney J. Fuller; Booth Udall Fuller, PLC

(57) ABSTRACT

A method for producing work is disclosed. The method includes increasing the pressure of a working fluid including carbon dioxide from a first pressure at least equal to a triple point pressure to a second pressure above the triple point pressure. The method also includes heating the working fluid, extracting mechanical work by expanding a first portion of the heated working fluid to a third pressure, (Continued)

supplying a second portion of the heated working fluid as a motive fluid to an ejector, increasing the pressure of the expanded working fluid by supplying the expanded working fluid to the ejector to combine with the motive fluid and form an output fluid at the fourth pressure, the fourth pressure at least equal to the triple point pressure of the working fluid. The method also includes refrigerating the output fluid to condense a vapor phase into a liquid phase.

20 Claims, 8 Drawing Sheets

(51) Int. Cl.
*F22B 1/02* (2006.01)
*F28D 20/00* (2006.01)
*F28D 20/02* (2006.01)

(56) References Cited

U.S. PATENT DOCUMENTS

| | | | |
|---|---|---|---|
| 4,995,234 | A | 2/1991 | Kooy et al. |
| 9,410,736 | B2 | 8/2016 | Baxter |
| 10,413,858 | B2 | 9/2019 | Mu et al. |
| 10,711,400 | B2 | 7/2020 | Wright et al. |
| 2009/0179429 | A1 | 7/2009 | Ellis et al. |
| 2012/0131921 | A1* | 5/2012 | Held .................. F01K 25/08 60/671 |
| 2014/0090405 | A1* | 4/2014 | Held .................. F25B 1/06 62/79 |
| 2014/0373544 | A1* | 12/2014 | Mohan .................. F01K 9/003 60/670 |
| 2016/0146061 | A1 | 5/2016 | Kalra et al. |
| 2016/0223234 | A1* | 8/2016 | Vaisman .............. F25B 9/008 |
| 2016/0369658 | A1 | 12/2016 | Lee et al. |
| 2018/0105780 | A1 | 4/2018 | Rittmann et al. |

FOREIGN PATENT DOCUMENTS

| | | | |
|---|---|---|---|
| WO | 2016164563 | A1 | 10/2016 |
| WO | 2016164781 | A1 | 10/2016 |
| WO | 2016164781 | A9 | 10/2016 |
| WO | 2019165151 | A1 | 8/2019 |
| WO | WO-2019231400 | A1 * | 12/2019 ........... F04F 5/16 |
| WO | 2020092272 | A1 | 5/2020 |
| WO | 2020092273 | A1 | 5/2020 |
| WO | 2020163513 | A1 | 8/2020 |
| WO | 2020163533 | A1 | 8/2020 |

OTHER PUBLICATIONS

Zalba, B. et al., "Review on thermal energy storage with phase change: materials, heat transfer analysis and applications", Applied Thermal Engineering, Feb. 2003 [available online Dec. 2002], vol. 23, No. 3, pp. 251-283 <DOI:10.1016/S1359-4311(02)00192-8>.
U.S. Appl. No. 16/927,775, filed Jul. 13, 2020, Wright et al.
U.S. Appl. No. 16/975,110, filed Aug. 21, 2020, Lackner et al.

* cited by examiner

SYSTEM AND METHOD FOR CARBON DIOXIDE UPGRADE AND ENERGY STORAGE USING AN EJECTOR

RELATED APPLICATIONS

This application is the U.S. National Stage of International Application No. PCT/US2018/048550, filed Aug. 29, 2018, which claims the benefit of U.S. provisional patent application 62/551,738, filed Aug. 29, 2017 titled "Carbon Dioxide Upgrade and Energy Storage System and Method," the contents of each of which are incorporated herein by reference in their entireties.

TECHNICAL FIELD

Aspects of this document relate generally to carbon dioxide upgrade and energy storage.

BACKGROUND

Carbon dioxide has a number of properties that make it attractive for use in industrial applications. Some inherent advantages of the use of CO2 include high thermal conductivity in both liquid and solid phases, low density variation, high density, small or no undercooling, chemically stable, phase separation capable, compatible with container materials, non-toxic, non-flammable, non-polluting, cheap and abundant.

Most thermal energy storage systems are high temperature. In current technologies, the use of CO2 for an energy storage/working fluid has been largely dismissed because of a reliance on cycles operating wholly above the triple point pressure, which for carbon dioxide is high. This would require additional high-temperature heat sources. Additionally, for carbon capture and storage (CCS) or carbon capture, use and storage (CCUS) carbon dioxide recovered from a process or atmospheric source must be further "upgraded" to increase its pressure and purity in order to satisfy downstream transportation, use and storage requirements. The upgrade of carbon dioxide for CCS/CCUS is problematic because many capture processes operate at low-pressure, below the triple point pressure of CO2, such that CO2 cannot be condensed to a liquid. Furthermore, some capture processes operate cyclically or intermittently, requiring an upgrade system to be available on demand.

Purification processes such as phase separation, adsorption, absorption and membrane separation operate more effectively at higher pressure. To pressurize a fluid comprising CO2 initially below its triple point pressure, the fluid cannot be condensed and pumped, so vapor phase compression is necessary. Vapor compression typically requires more energy and more expensive equipment than liquid phase pressurization.

SUMMARY

According to one aspect, a method for producing work includes increasing the pressure of a working fluid with a pressurization device, from a first pressure at least equal to a triple point pressure of the working fluid to a second pressure above the triple point pressure of the working fluid and higher than the first pressure. The working fluid includes carbon dioxide. The method also includes heating the working fluid with a first heat exchanger until it is substantially one of a vapor and a supercritical fluid, extracting mechanical work by expanding a first portion of the heated working fluid to a third pressure below the triple point pressure of the working fluid, and supplying a second portion of the heated working fluid as a motive fluid to a high-pressure motive inlet of an ejector. Additionally, the method includes increasing the pressure of the expanded working fluid from the third pressure to a fourth pressure while decreasing the pressure of the motive fluid to the fourth pressure by supplying the expanded working fluid to a low-pressure inlet of the ejector to combine with the motive fluid to form an output fluid at the fourth pressure. The fourth pressure is at least equal to the triple point pressure of the working fluid. Finally, the method includes refrigerating the output fluid received from an outlet of the ejector to condense a vapor phase portion of the output fluid into a liquid phase.

Particular embodiments may comprise one or more of the following features. Refrigerating the output fluid from the ejector may include exchanging heat between the output fluid from the ejector and a carbon dioxide solid, and/or converting at least a portion of the carbon dioxide solid to at least one of a liquid phase and a vapor phase having a storage pressure that may be least equal to a triple point pressure of carbon dioxide. The output fluid from the ejector may be in direct fluid communication with the carbon dioxide solid. The method may further include producing the carbon dioxide solid by extracting heat from at least one of a carbon dioxide liquid and a carbon dioxide vapor at a pressure that may be at least equal to a triple point pressure of carbon dioxide. The production of the carbon dioxide solid may be asynchronous from the extraction of mechanical work. Refrigerating the output fluid from the ejector may be accomplished using a Stirling cooling cycle. A working fluid of the Stirling cooling cycle may include carbon dioxide. The working fluid of the Stirling cooling cycle may be in direct fluid communication with the carbon dioxide solid. The pressurization device may be a liquid pump. The second pressure may be a pressure corresponding to a vapor-liquid equilibrium proximate an atmospheric ambient temperature. Heating the working fluid may be accomplished by an ambient source. The second pressure may be a pressure corresponding to a vapor-liquid equilibrium below an atmospheric ambient temperature. Heating the working fluid may include providing refrigeration to an external source. The second pressure may be one of a pressure corresponding to a vapor-liquid equilibrium above the atmospheric ambient temperature and a supercritical pressure. Heating the working fluid may include extracting heat from an external super-ambient temperature source. Heating the working fluid may include transferring heat from a water supply in a liquid phase to the working fluid, converting the water supply to a solid phase. The method may also include converting the water supply from a solid phase to a liquid phase by exchanging heat with an external source. Extracting mechanical work by expanding the first portion of the heated working fluid to the third pressure may include a plurality of expansion steps, each expansion step may include the expansion of the first portion of the heated working fluid from a starting pressure to an ending pressure and/or the heating of the first portion of the heated working fluid until the first portion is substantially vapor. Heating the working fluid may include exchanging heat between the working fluid and the output fluid from the ejector. The working fluid, prior to pressurization to the second pressure, may be substantially vapor. The carbon dioxide solid may be produced by providing electrical energy to a mechanical refrigeration system. The carbon dioxide solid may be produced by providing thermal energy to an adsorption refrigeration system. Finally, the carbon dioxide solid may be produced through the vaporization of a cryogenic fluid.

According to another aspect of the disclosure, a method to pressurize a source fluid includes increasing the pressure of a working fluid with a pressurization device, from a first pressure at least equal to a triple point pressure of the working fluid to a second pressure above the triple point pressure of the working fluid and higher than the first pressure. The working fluid includes carbon dioxide. The method also includes heating the working fluid with a first heat exchanger until it is substantially one of a vapor and a supercritical fluid, supplying the heated working fluid as a motive fluid to a high-pressure motive inlet of an ejector, and increasing the pressure of the source fluid comprising carbon dioxide, from a third pressure below a triple point pressure of the source fluid to a fourth pressure, by supplying the source fluid to a low-pressure inlet of the ejector to combine with the motive fluid to form an output fluid at the fourth pressure. The fourth pressure is at least equal to the triple point pressure of the source fluid.

Particular embodiments may comprise one or more of the following features. The method may further include refrigerating the output fluid received from an outlet of the ejector to condense a vapor phase portion of the output fluid into a liquid phase. A portion of the condensed output fluid may be supplied as at least a portion of the working fluid at the first pressure. Refrigerating the output fluid may include exchanging heat between the output fluid and a supply of carbon dioxide solid, converting a portion of the carbon dioxide solid to at least one of a liquid phase and a vapor phase having a storage pressure that may be at least equal to a triple point pressure of carbon dioxide. The output fluid and the supply of carbon dioxide solid may be in direct fluid communication. The supply of carbon dioxide solid may be produced asynchronously from the pressurization of the source fluid. Heat may be exchanged between the working fluid at the second pressure and the source fluid at the third pressure. The method may further include refrigerating the source fluid at the third pressure to condense a low volatility component of the source fluid, and/or removing the condensed low volatility component from the source fluid at the third pressure. The output fluid may include a high volatility component that may be in a substantially vapor phase after the output fluid has been condensed to a liquid phase. The high volatility component may be removed after the output fluid has been condensed.

According to yet another aspect of the disclosure, a system for producing work includes a pressurization device communicatively coupled to a second heat exchanger and configured to pressurize a working fluid drawn from the second heat exchanger from a first pressure at least equal to a triple point pressure of the working fluid to a second pressure above the triple point pressure of the working fluid. The working fluid includes carbon dioxide. The system also includes a first heat exchanger in thermal contact with the working fluid pressurized by the pressurization device and configured to heat the working fluid until it is substantially one of a vapor and a supercritical fluid, and an expansion device communicatively coupled to the pressurization device through the first heat exchanger to produce mechanical work by expanding a first portion of the heated working fluid from the second pressure to a third pressure below the triple point pressure of the working fluid. The system further includes an ejector communicatively coupled to the expansion device through a low-pressure inlet of the ejector to receive the expanded working fluid at the third pressure, and also communicatively coupled to the pressurization device through a high-pressure motive inlet of the ejector to receive a second portion of the heated working fluid at the second pressure as a motive fluid, and further communicatively coupled to the second heat exchanger through an outlet of the ejector to provide an output fluid at a fourth pressure to the second heat exchanger. The fourth pressure is at least equal to the triple point pressure of the working fluid and the output fluid including the first and second portions of the working fluid. The second heat exchanger refrigerates the output fluid to condense a vapor phase portion of the output fluid into at least a liquid phase before being supplied to the pressurization device.

Particular embodiments may comprise one or more of the following features. The system may further include an insulated vessel that may include a carbon dioxide supply in at least a solid phase and/or a liquid phase. The second heat exchanger may refrigerate the output fluid by exchanging heat between the output fluid from the ejector and the carbon dioxide supply of the insulated vessel, converting at least a portion of the carbon dioxide solid to at least one of a liquid phase and a vapor phase having a storage pressure that may be at least equal to the triple point pressure of carbon dioxide. Output fluid of the ejector may be in direct fluid communication with the carbon dioxide supply of the insulated vessel. The system may further include a heat engine thermally coupled to the insulated vessel and configured to extract work from the carbon dioxide supply. The heat engine and the second heat exchanger may be the same device.

According to still another aspect of the disclosure, a system to pressurize a source fluid includes a pressurization device communicatively coupled to a second heat exchanger and configured to pressurize a working fluid drawn from the second heat exchanger from a first pressure at least equal to a triple point pressure of the working fluid to a second pressure above the triple point pressure of the working fluid and higher than the first pressure. The working fluid includes carbon dioxide. The system also includes a first heat exchanger in thermal contact with the working fluid pressurized by the pressurization device and configured to heat the working fluid until it is substantially one of a vapor and a supercritical fluid, and an ejector communicatively coupled to a low-pressure fluid source via a low-pressure inlet of the ejector to receive the source fluid at a third pressure below a triple point pressure of the source fluid, and also communicatively coupled to the pressurization device through a high-pressure motive inlet of the ejector to receive the heated working fluid at the second pressure as a motive fluid, and further communicatively coupled to the second heat exchanger through an outlet of the ejector to provide an output fluid at a fourth pressure to the second heat exchanger. The fourth pressure is at least equal to the triple point pressure of the source fluid. The second heat exchanger refrigerates at least a portion of the output fluid to condense a vapor phase portion of the output fluid into at least a liquid phase before being supplied to the pressurization device. The system is configured to emit output fluid at a rate substantially equal to an input rate of source fluid from the low-pressure fluid source.

Particular embodiments may comprise one or more of the following features. The system may also include an insulated vessel communicatively coupled to the second heat exchanger and the outlet of the ejector and may include a carbon dioxide supply in at least a solid phase and/or a liquid phase. The second heat exchanger may refrigerate the carbon dioxide supply. The output fluid of the ejector may be in direct fluid communication with the carbon dioxide solid.

The carbon dioxide supply may have a supply pressure at least equal to the triple point pressure of carbon dioxide. The system may include a separation chamber communicatively coupled to the insulated vessel and the outlet of the ejector, and/or a third heat exchanger communicatively coupled to the outlet of the ejector and the separation chamber and coupled to the insulated vessel. The output fluid may be in indirect thermal contact with the carbon dioxide supply of the insulated vessel before entering the separation chamber in a substantially liquid phase while a high volatility component of the output fluid may remain in a substantially vapor phase. The condensed liquid phase output fluid in the separation chamber may be in direct fluid communication with the carbon dioxide supply. Lastly, the system may include a fourth heat exchanger coupled to the low-pressure fluid source, the pressurization device and the first heat exchanger. The source fluid may be refrigerated through the fourth heat exchanger by exchanging heat with the working fluid at the second pressure before reaching the first heat exchanger. The source fluid may be refrigerated sufficient to condense a low volatility component of the source fluid. The condensed low volatility component may be removed from the source fluid at the third pressure.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DETAILED DESCRIPTION

Figure 1:
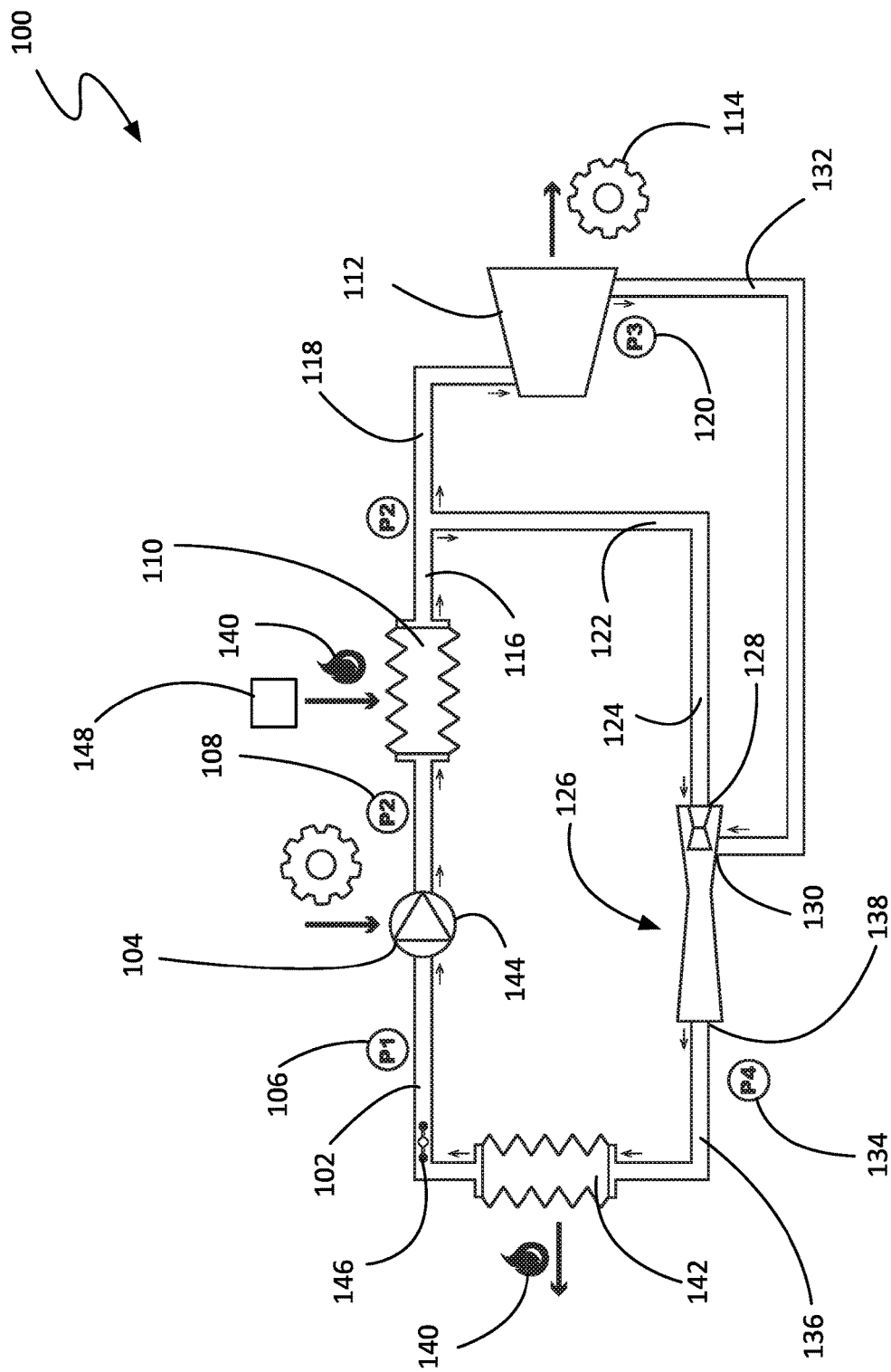
FIGS. 1-3, and 8 are schematic views of systems for producing work.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Carbon dioxide has a number of properties that make it attractive for use in industrial application. Some inherent advantages of the use of CO2 include high thermal conductivity in both liquid and solid phases, low density variation, high density, small or no undercooling, chemically stable, phase separation capable, compatible with container materials, non-toxic, non-flammable, non-polluting, cheap and abundant.

Most thermal energy storage systems are high temperature. In current technologies, the use of $CO_2$ for an energy storage/working fluid has been largely dismissed because of a reliance on cycles operating wholly above the triple point pressure, which for carbon dioxide is high. This would require additional high-temperature heat sources.

Additionally, for carbon capture and storage (CCS) or carbon capture, use and storage (CCUS) carbon dioxide recovered from a process or atmospheric source must be further "upgraded" to increase its pressure and purity in order to satisfy downstream transportation, use and storage requirements. The upgrade of carbon dioxide for CCS/CCUS is problematic because many capture processes operate at low-pressure, below the triple point pressure of $CO_2$, such that $CO_2$ cannot be condensed to a liquid. Furthermore, some capture processes operate cyclically or intermittently, requiring an upgrade system to be available on-demand.

Purification processes such as phase separation, adsorption, absorption and membrane separation operate more effectively at higher pressure. To pressurize a fluid comprising $CO_2$ initially below its triple point pressure, the fluid cannot be condensed and pumped, so vapor phase compression is necessary. Vapor compression typically requires more energy and more expensive equipment than liquid phase pressurization.

Contemplated herein are systems and methods wherein carbon dioxide can be used as the primary component of a working fluid in a Rankine cycle engine with the unique characteristic that the entire cycle operates substantially below ambient temperature and the bottom pressure of the cycle is substantially below the triple point pressure of $CO_2$. A unique advantage of this method of work extraction is that the high-pressure and low-pressure end of the cycle can comfortably straddle the triple point pressure due to the use of ejectors. Ejectors make it possible to incorporate phase changes into the process and enable wholly sub-ambient temperature operation. These types of systems can be particularly useful where the energy or exergy is utilized for refrigeration, and can be useful for purifying and compressing a stream comprising $CO_2$ at low density. Because the working fluid can freely mix with the product stream, heat transfer can be extremely efficient.

Through the disclosed systems and methods, carbon dioxide can be utilized as an effective phase-change material for cold energy storage, satisfying important characteristics for energy storage materials while providing some considerable advantages over other materials. Vapor-liquid, vapor-solid and liquid-solid phase transitions all occur within practical temperature and pressure regimes. The vapor-liquid phase-change temperature can be fitted to an application with the advantage of a high change of enthalpy near temperature of use. Energy or exergy can be stored in the fusion of liquid $CO_2$ to solid $CO_2$, using the temperature difference with ambient temperature to operate a heat engine with an energy storage density of about 100 kJ/liter.

Some embodiments include a system and method for storing energy and producing useful work using carbon dioxide ($CO_2$) as simultaneously a phase-change material and working fluid. The stored energy available in the phase change may be returned as electric power, shaft work, refrigeration, or to upgrade a fluid comprising $CO_2$ to a higher density or purity. Energy from an electrical or thermal source is stored as refrigeration of carbon dioxide to form an inventory of solid phase in equilibrium with a liquid phase at or above the triple point pressure of $CO_2$. Asynchronously, when energy output is required, a fluid portion of $CO_2$ is removed from this inventory and pressurized to perform useful work, which may include power generation, shaft work, refrigeration, and/or upgrade of a low-pressure $CO_2$ source.

All or a portion of the pressurized $CO_2$ may be used as a motive fluid in an ejector in which, the ejector suction fluid comprises $CO_2$ below its triple point pressure, and the ejector discharge fluid is at or above the $CO_2$ triple point pressure. This permits a low bottom pressure in the cycle to improve expansion energy output or enable the capture and/or compression of low-pressure $CO_2$ for carbon capture, use and storage. The conversion of solid phase $CO_2$ to liquid phase $CO_2$ in the inventory provides the heat sink for refrigeration and condensation. Since the process operates near or below ambient temperature, thermal energy can be provided by heat from the surrounding environment or other external systems.

Some embodiments of the disclosed systems and methods provide for carbon dioxide upgrade, and can accommodate a continuous or intermittent $CO_2$ source as a fluid initially below the triple point pressure. Advantageously, the energy requirement for upgrade can be taken at a preferred time, such as when electricity is available from an intermittent renewable energy source or during off-peak electric power supply periods, then stored by freezing liquid to solid $CO_2$ for the time when required for upgrade.

In other embodiments, the energy storage capability can be applied more generally, operating with $CO_2$ fluid in a closed system to store energy and asynchronously produce mechanical work through vapor expansion. When energy storage is coupled with refrigeration or $CO_2$ capture upgrade, this method can provide a round trip efficiency greater than 80%. Furthermore, these types of systems can be adapted for time-of-day energy storage primarily using available process equipment.

Embodiments of the invention relate generally to a storage system that provides a compact energy storage system. Some embodiments of the invention include a method and system for cold energy storage using carbon dioxide as a primary working fluid for power generation. In some embodiments, the system can optionally cogenerate power and refrigeration such as for HVAC. In some embodiments, the process is particularly suitable for compression, purification or liquefaction of carbon dioxide ($CO_2$) from low-pressure sources such as fermenters or carbon capture systems.

FIG. 1 is a schematic view of a non-limiting example of a system 100 for producing work using carbon dioxide. As shown, the system 100 comprises a pressurization device 104 communicatively coupled to a first heat exchanger 110 and a second heat exchanger 142. The first heat exchanger 110 is also communicatively coupled to the input of an expansion device 112 and an ejector 126, specifically the high-pressure motive inlet 128 of the ejector 126. The output of the expansion device 112 is communicatively coupled to the ejector 126 through the low-pressure inlet 130. Finally, the outlet 138 of the ejector 126 is communicatively coupled to the second heat exchanger 142, forming a circuit filled with a fluid comprising carbon dioxide 146.

According to various embodiments, the pressurization device 104 may be any pressurization device that is compatible with carbon dioxide known in the art. In some embodiments, the pressurization device 104 may be a liquid pump 144. This may be advantageous, as pumping liquid phase carbon dioxide requires only a fraction of the energy needed to pressurize carbon dioxide as a vapor.

According to various embodiments, working fluid 102 is a fluid comprising CO2. As shown, the cycle begins with the working fluid 102 at a first pressure 106 that is at or above the triple point pressure (about 518 kPa).

In some embodiments, the working fluid 102 may be pressurized to a second pressure 108 substantially above the triple point pressure (e.g. supercritical) as a pressurized working fluid 102 through work applied to the fluid by the pressurization device 104. In some embodiments, the pressurization device 104 can be a conventional pump or compressor, or any conventional means to cause an increase in pressure.

As shown, the pressurized working fluid 102, at a second pressure 108, is then heated in the first heat exchanger 110 to become a heated working fluid 116. According to various embodiments, the working fluid may be heated to a temperature at which the fluid is substantially vapor at saturation temperature or superheated temperature. Next, a first portion 118 of the heated working fluid 116 is passed into the expansion device 112, where it goes from the second pressure 108 to a third pressure 120 that is lower than the second pressure 108, extracting mechanical work 114. In some embodiments, the expansion device 112 can be a conventional expander or turbine, a turbo expander, or any conventional device or method known in the art to enable this decrease in pressure. In some embodiments, useful energy can be removed from expansion device 112 as mechanical shaft work or electric power generation. In other embodiments, the expanded working fluid 132 is at a third pressure 120 that can be substantially below the triple point pressure and may be near or below atmospheric pressure.

In order for the expanded working fluid 132 to be condensed and restart the cycle, it must first be increased in pressure to at or above the triple point pressure. According to various embodiments, this is accomplished using the ejector device 126. The expanded working fluid 132 at the third pressure 120 is sent from the expansion device 112 to the low-pressure inlet 130, sometimes referred to as the suction inlet. A second portion 122 of the heated working fluid 116 (i.e. motive fluid 124) at the second pressure 108 is sent to high-pressure inlet 128, sometimes referred to as the motive inlet. In some embodiments, the second portion 122 is simply the remainder of the heated working fluid 116.

According to various embodiments, the mass ratio of the motive fluid 124 at the second pressure 108 to the expanded working fluid 132 at the third pressure 120 can be established such that the output fluid 136 representing the combined fluid has a pressure (e.g. fourth pressure 134) at or above the triple point pressure. In some embodiments, this can be determined as a function of the state properties of the inlet streams and the unique efficiency of the specific ejector device. The circuit is completed by condensing the output fluid 136 using the second heat exchanger 142 until it is ready for another cycle.

In some embodiments, the heat 140 added to the system through the first heat exchanger 110 may be obtained from an ambient source 148. The system 100 may be advantageously operated at sub-ambient pressures on the low-pressure side, allowing for heat to be obtained from the ambient environment, further reducing the energy needed.

Figure 2:
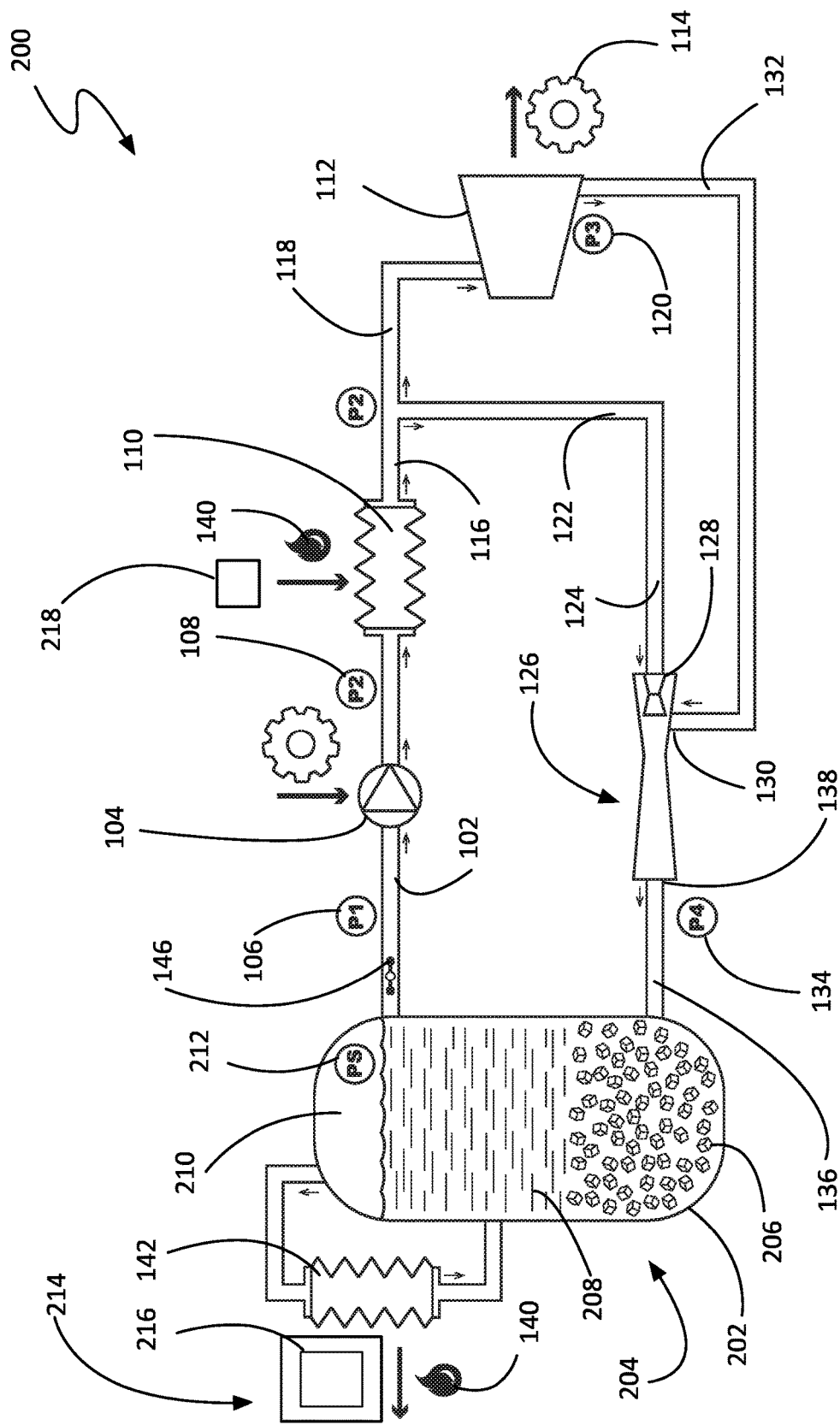

FIG. 2 is a schematic view of a non-limiting example of a system 200 for producing work. Similar to the non-limiting example of FIG. 1, this system 200 makes use of a carbon dioxide supply 204 that is stored in a vessel 202. In some embodiments, this vessel 202 is insulated. As shown, the vessel 202 may be inserted into the system 100 of FIG. 1 in the position previously taken by the second heat exchanger 146, which is now coupled at both ends to the vessel 202.

According to various embodiments, the output fluid 136 may be refrigerated to convert it from substantially a vapor to substantially a liquid using the second heat exchanger 142 by removing heat 140. In some embodiments, heat 140 can be removed from the output fluid 136 via heat exchange with a second fluid comprising CO2 at a pressure 212 that is at or above the triple point pressure, and converting a portion of that second fluid from a solid phase 206 to a liquid phase 208 or even a vapor phase 210, and thereby providing refrigeration. In some embodiments, this may be performed by indirect heat exchange (see FIG. 8), or by heat exchange with the direct fluidic communication shown in FIG. 2. Specifically, the direct fluidic communication may take place within the vessel 202.

In some embodiments, the CO2 solid 206 used in heat exchange can be created by refrigeration of an inventory of CO2 in vessel 202 at a storage pressure 212 at or above its triple point pressure with second heat exchanger 142. In some embodiments, this inventory may comprise solid 206 and liquid 208 phases, or solid 206, liquid 208 and vapor 210 phases, in equilibrium. In some embodiments, the conversion of CO2 from liquid to solid phase can be performed asynchronously with the energy output of the working fluid 102. Hence, the method enables energy storage wherein energy is "stored" as the energy or exergy associated with the low-temperature refrigeration of CO2. In some embodiments, the source of energy to provide for this refrigeration to second heat exchanger 142 can be from a mechanical refrigeration system, or an absorption/adsorption refrigeration system, or from the vaporization of a cryogenic liquid such as liquefied natural gas (LNG) or liquid nitrogen or a combination of such sources.

Figure 8:
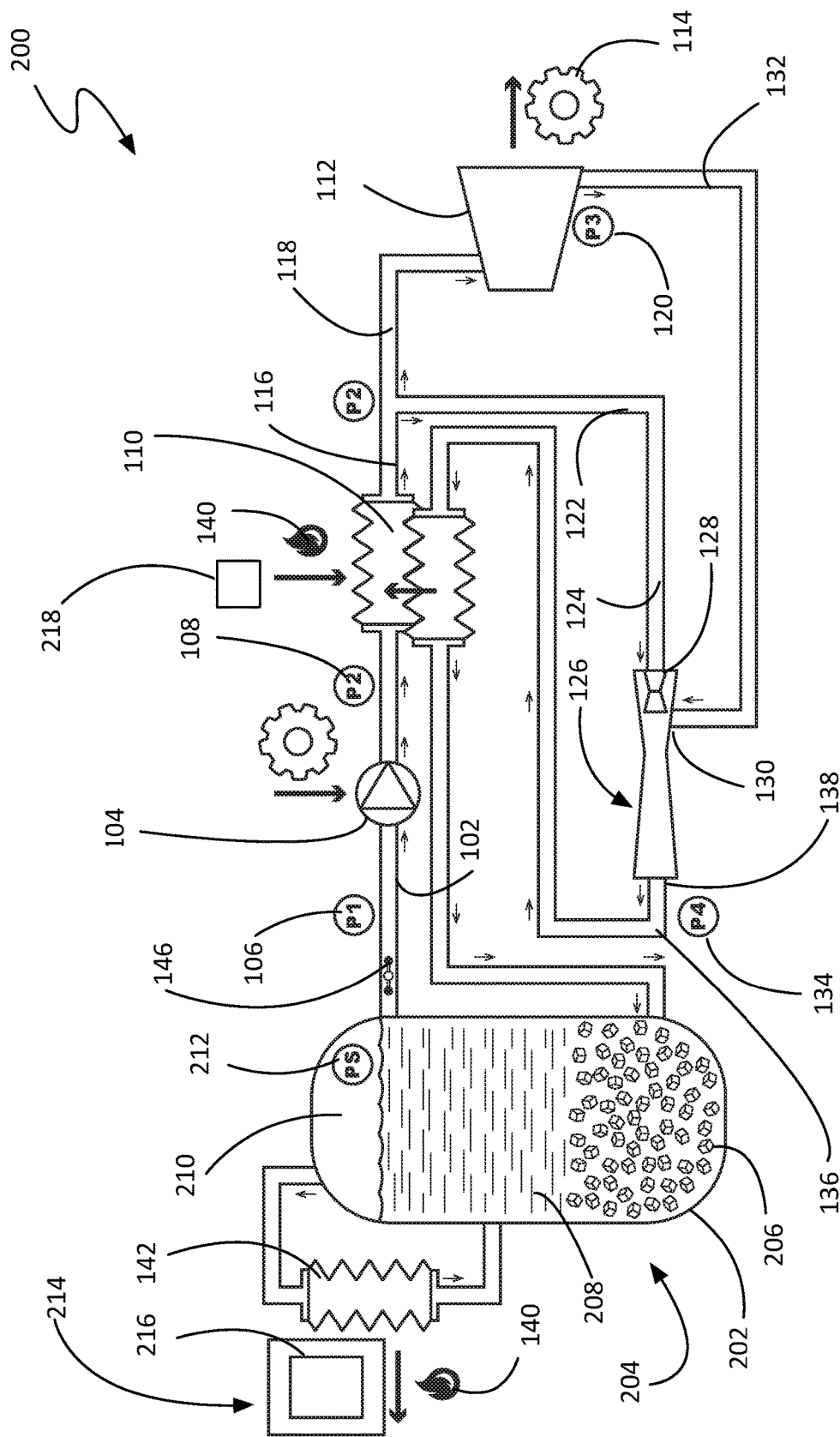

In some embodiments of the invention, the cycle high pressure (i.e. second pressure 108) of the pressurized working fluid 102 in FIGS. 1, 2, and 8 may be designated such that the heated working fluid 116 is heated to a preferred temperature near the vapor liquid equilibrium temperature with a small amount of superheat from an external super-ambient temperature source 218. In some embodiments, the preferred temperature of the heated working fluid 116 may be that of the surrounding atmosphere such that heat can be provided without an additional energy source. Alternatively, in some embodiments, the preferred temperature of the heated working fluid 116 can be below ambient temperatures to provide refrigeration to another system such as an HVAC system or process refrigerator. Alternatively, in some embodiments, the preferred temperature of the heated working fluid 116 can be above ambient temperature corresponding to the approach to the temperature of an available heat source.

In some embodiments, the CO2 supply 204 may be used as a low-temperature heat sink for rejection of heat from a "Stirling engine cycle" 214 operating between a lower temperature and a higher temperature that is below, near or above the ambient temperature. In the context of the present description and the claims that follow, a Stirling engine cycle refers to any variation associated with the classic closed-system vapor cycle which produces work by sequential near-isothermal compression, near-constant volume heating, near-isothermal expansion, and near-constant volume cooling, in which thermal energy is stored and exchanged between the constant volume steps with a regenerator so that these constant volume steps are nearly externally adiabatic. This Stirling engine cycle is in thermal communication with the CO2 inventory. In some embodiments, CO2 is the working fluid 216 of the Stirling engine. As an option, the Stirling engine cycle may be in direct fluidic communication with the vapor 210 phase of the CO2 supply 204.

In other embodiments, a Stirling cycle 214 may be operated in reverse as a Stirling cooling cycle which produces refrigeration by sequential near-isothermal compression, near-constant volume cooling, near-isothermal expansion, and near-constant volume heating, with regenerator heat transfer between constant volume steps. In some embodiments, the Stirling cooling cycle can provide refrigeration for producing CO2 solid 206 in the CO2 inventory 204. In a particular embodiment, this refrigeration step can be performed asynchronously with the work production step, establishing this is as an energy storage process consuming energy with a Stirling cooler cycle and producing energy with a Stirling engine cycle. In another embodiment, a system can employ common elements of apparatus that asynchronously perform the function of both a Stirling engine device and a Stirling cooler device even though the implementation of the heat engine/refrigeration unit shows large deviations from a Stirling cycle.

Figure 3:
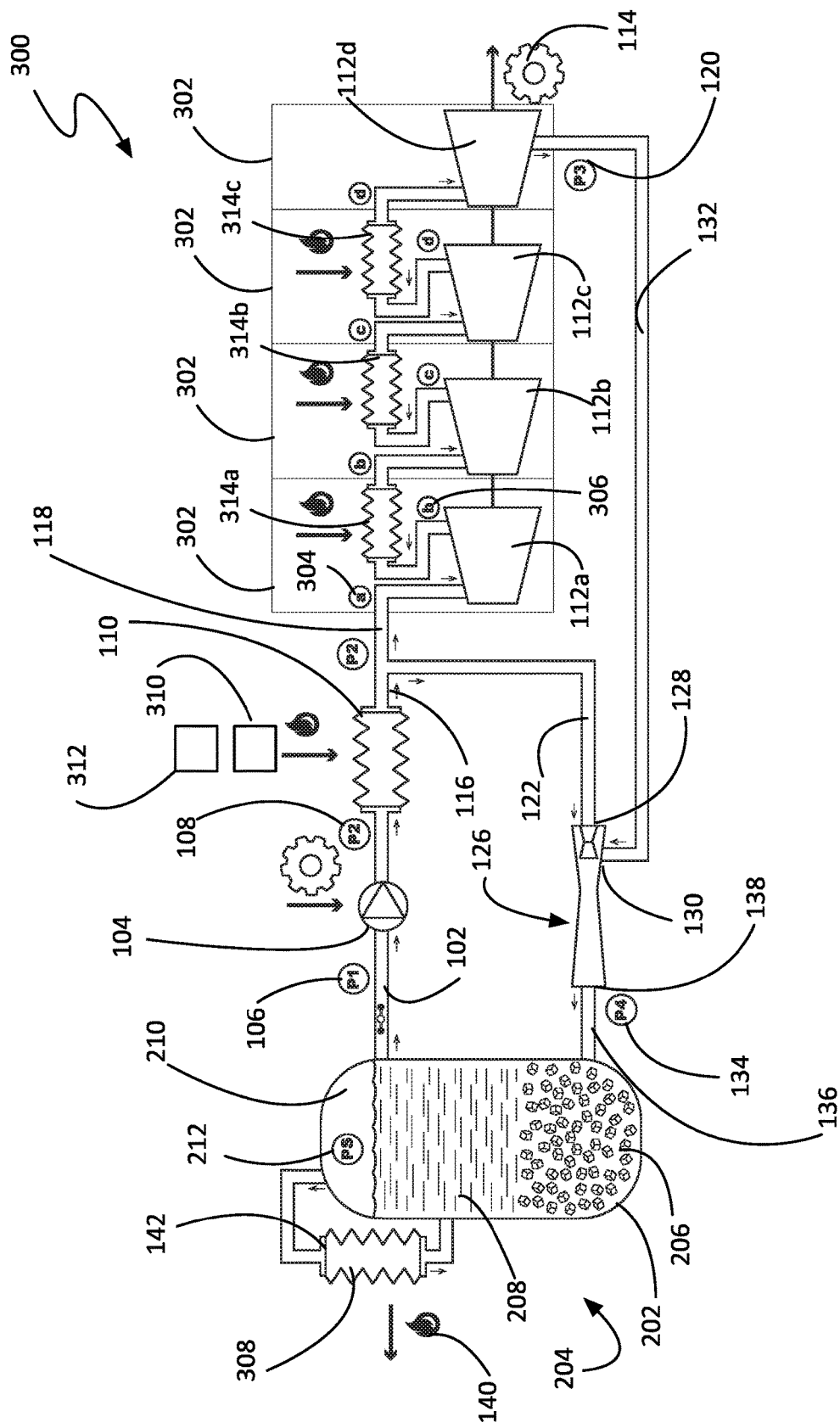

FIG. 3 shows a schematic view of a non-limiting example of a system 300 for producing work. Similar to the system 100 shown in FIG. 2, this system 300 splits the expansion of the first portion 118 of the heated working fluid 116 into a series of expansion steps 302 with intermediate heat 140 input provided through intermediate heat exchangers 314 such that the expanding fluid remains substantially vapor at each stage. Each step begins at a starting pressure 304 and ends with an ending pressure 306, with the next step starting where the last step left off.

In another embodiment of the invention, the temperature of the pressurized working fluid 102 at the second pressure 108 may be partially equilibrated with the temperature of the output fluid 136 using the first heat exchanger 110 to transfer heat from the output fluid 136 to the pressurized working fluid 102. In another embodiment, the working fluid 102 at the first pressure 106 in FIGS. 1, 2, 3, and 8 may be substantially liquid, and pressurization device 104 can be a liquid pump 144. In still another embodiment, the working fluid 102 at the first pressure 106 in FIGS. 1 and 2, and 3 and 8 may be substantially vapor, produced by converting liquid CO2 to vapor and solid phases, and pressurization device 104 can be a vapor compressor.

Some embodiments include solid/liquid/vapor CO2 near the triple point as a storage system for energy or exergy and a method to store energy or exergy. In some embodiments, the carbon dioxide supply 204 can be coupled with a second temperature reservoir at higher temperature, and can be used as an energy storage system that uses a heat engine 308 to extract energy and a heat pump to inject energy into the storage 204. In some embodiments, the heat pump and heat engine can be physically the same device 308, or they could be separate units, coupled and/or fluidly coupled. As many heat engines 308 and heat pumps operate on a working fluid, one choice for the working fluid is CO2. If CO2 is the working fluid of choice, it may be possible to consider systems where the working fluid is in fluidic contact with the storage inventory, greatly increasing the efficiency of heat transfer.

According to various embodiments, the heat 140 added to a system through the first heat exchanger 110 may be obtained from a water supply 310 whose water is in a liquid phase. The transfer of heat 140 from the water supply 310 to the working fluid 102 may convert the water supply 310 into a solid phase. As an option, the water supply 310 may be thermally coupled to an external source 312 with which it may also exchange heat, converting the water supply 310 from a solid phase to a liquid phase, and providing refrigeration.

The non-limiting examples of systems shown in FIGS. 1-3 and 8, and discussed above, are closed systems. Carbon dioxide may be used as the primary component of a working fluid to pressurize a source fluid comprising CO2 from a low-pressure external source, from below the triple point pressure to a pressure above the triple point pressure.

Figure 4:
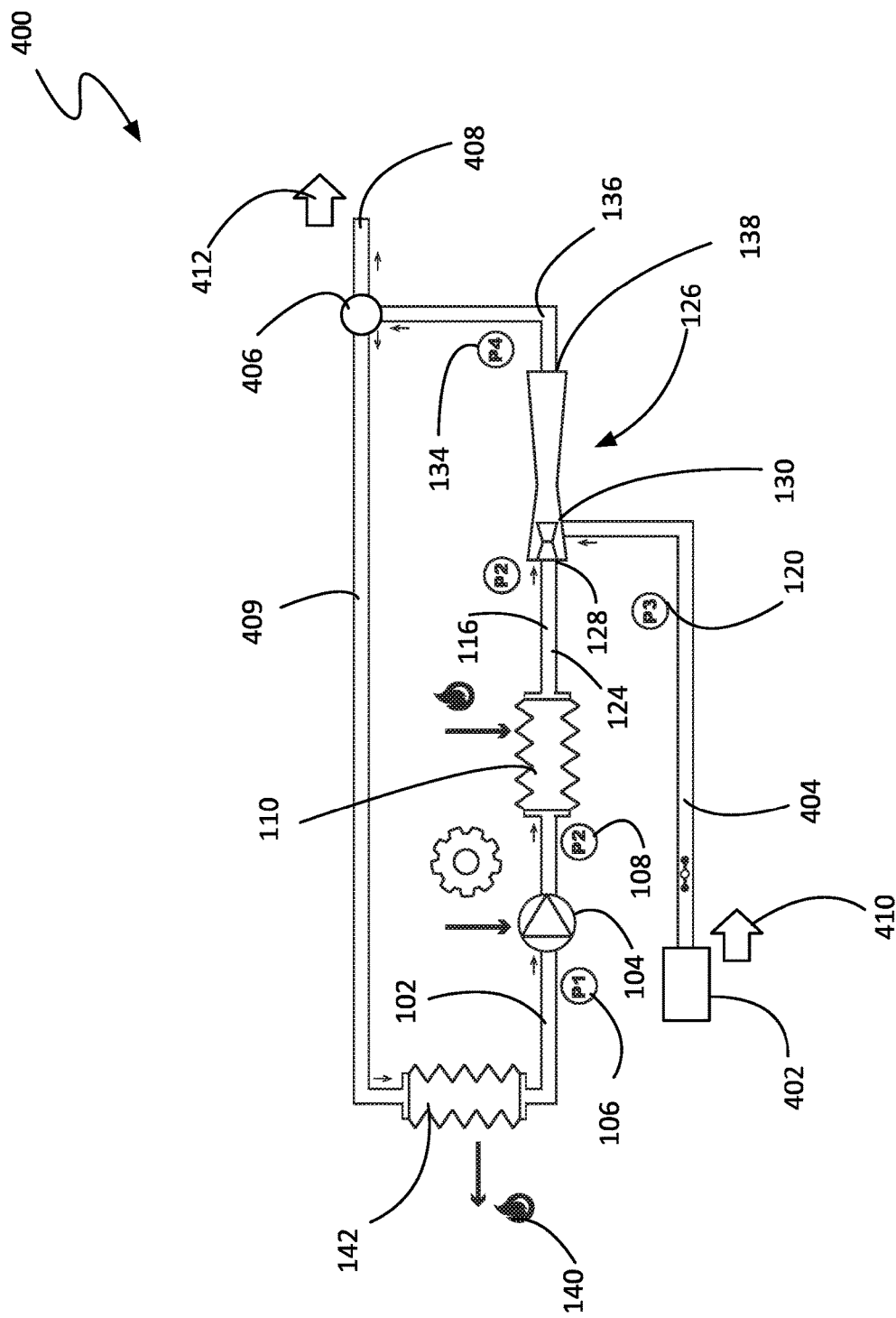
FIGS. 4-6 are schematic views of system for pressurizing a source fluid.

FIG. 4 is a schematic view of a non-limiting example of a system 400 to pressurize a source fluid 404. Similar to the systems discussed above, this system 400 comprises a pressurization device 104 coupled to a first heat exchanger 110 and a second heat exchanger 142. The first heat exchanger 110 is also coupled to the high-pressure motive inlet 128 of an ejector 126, whose outlet 138 is coupled to the second heat exchanger 142. Departing from the previously discussed systems, this system 400 also comprises a low-pressure fluid source 402 coupled to the low-pressure inlet 130 of the ejector 126. The low-pressure fluid source 402 provides the source fluid 404 that is being pressurized. The system 400 may additionally comprise a fluid separator 406 which may be a valve or a simple split in a pipeline and which divides fluid 408 from a portion of fluid 136 between the outlet of the ejector 126 and the second heat exchanger 142.

According to various embodiments, the source fluid 404 may be a vapor phase fluid comprising CO2 at a third pressure 120 that is substantially below the triple point. The working fluid 102 starts a cycle as a fluid comprising CO2 vapor at a first pressure 106 at or above the triple point pressure, about 518 kPa. In some embodiments, the working fluid 102 may be pressurized to a second pressure 108 substantially above the triple point pressure as a pressurized working fluid 102 via work applied to the fluid in pressurization device 104, which may be a liquid pump 144. The pressurized working fluid 102 is then heated in a first heat exchanger 110, becoming a heated working fluid 116 at the second pressure 108, at a temperature in which the fluid is substantially vapor at saturation temperature or superheated temperature.

As shown, the heated working fluid 116 serves as a motive fluid 124, entering the high-pressure inlet 128 of the ejector 126. According to various embodiments, the mass ratio of the motive fluid 124 to the source fluid 404 can be established such that the output fluid 136, representing the combined fluid, has a fourth pressure 134 at or above the triple point pressure. This is determined as a function of the state properties of the inlet streams and the unique efficiency of the specific ejector device.

In some embodiments, a portion of the output fluid 136, equivalent to about the mass of source fluid 20, can be removed as emission stream 408 through the fluid separator 406, matching an input rate 410 with an emission rate 412. In some further embodiments, a remaining output fluid 409 can be refrigerated to convert it from substantially a vapor to substantially a liquid in second heat exchanger 142 by removing heat.

Figure 5:
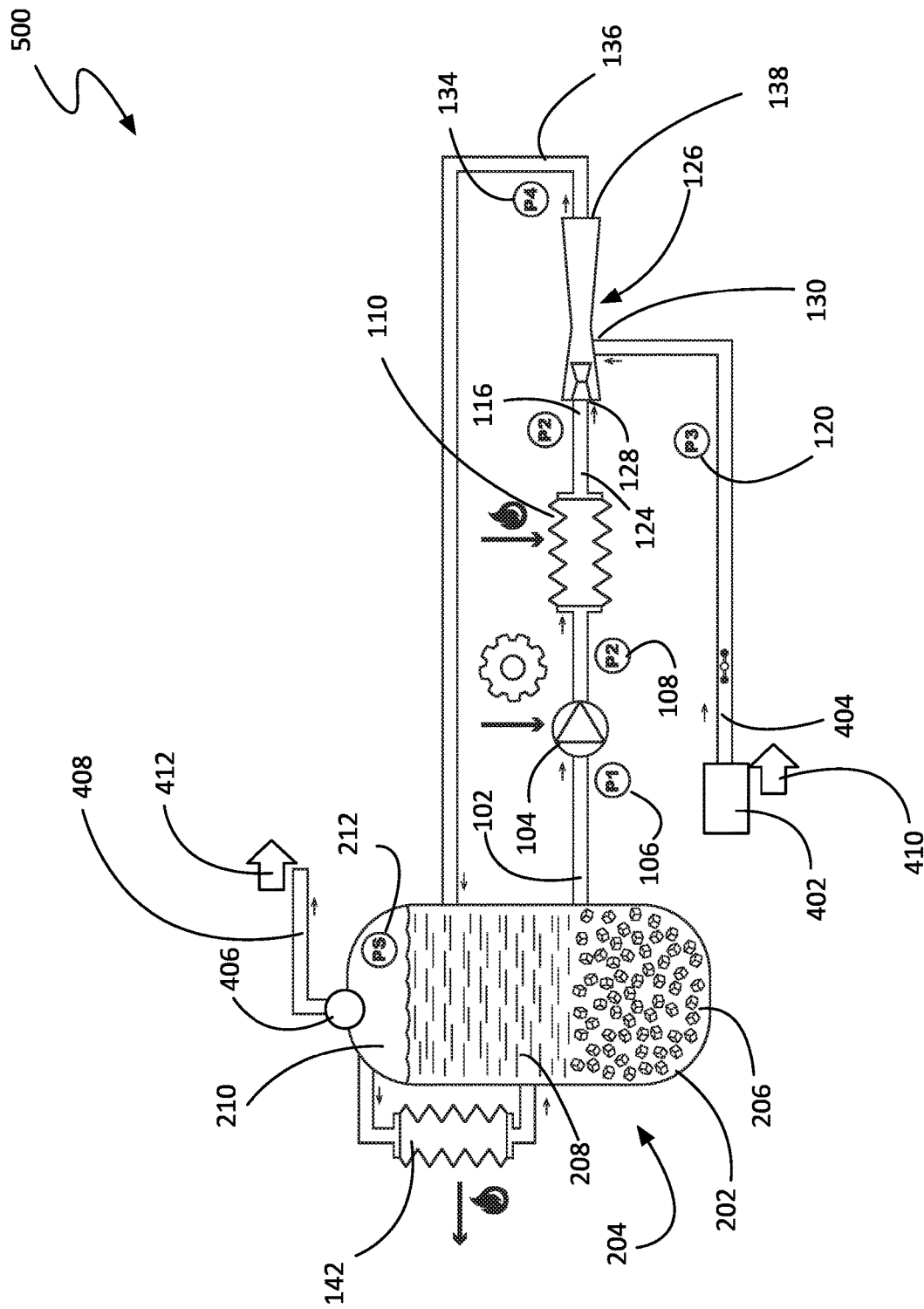

FIG. 5 shows a schematic view of a non-limiting example of a system 500 to pressurize a source fluid 404. As shown, the system 500 is similar to the non-limiting example shown in FIG. 4, but makes use of a carbon dioxide supply 204 in a vessel 202 to provide refrigeration that condenses the working fluid 102 before pressurization with the pressurization device 104. As an option, the fluid separator 406 may be coupled between the ejector 126 and the vessel 202, or may be coupled just to the vessel 202. Coupling the fluid separator 406 directly to the vessel 202 may be advantageous, as it may allow the selection of a particular phase for the emission stream 408, depending on the intended application.

According to various embodiments, heat may be removed from the output fluid 136 through heat exchange with a second fluid comprising $CO_2$ at or above its triple point, and converting a portion of that second fluid from a solid phase to a liquid phase (thereby providing refrigeration). In some embodiments, this can be performed by indirect heat exchange, or by heat exchange with direct fluidic communication as shown in FIG. 5. In some embodiments, the $CO_2$ solid 206 used in the heat exchange can be created by refrigeration of an inventory 204 of $CO_2$ in vessel 202 at or above its triple point pressure, using second heat exchanger 142. In some embodiments, this inventory 204 can comprise solid 206 and liquid 208 phases, or solid 206, liquid 208 and vapor 210 phases, in equilibrium. In some embodiments, the conversion of $CO_2$ from liquid 208 to solid 206 phase can be performed asynchronously with the pressurization of the working fluid 102. Hence, in some embodiments, this system 500 enables energy storage, where energy is "stored" as the energy or exergy associated with the low-temperature refrigeration of $CO_2$. In some embodiments of the invention, the source of energy to provide for this refrigeration to second heat exchanger 142 can be from a mechanical refrigeration system, or an absorption refrigeration system, or from the vaporization of a cryogenic liquid such as liquefied natural gas (LNG) or liquid nitrogen.

In some embodiments, the cycle high pressure of the pressurized working fluid 102 (i.e. second pressure 108) in FIGS. 4 and 5 can be designated such that the working fluid 102 may be heated with a small amount of super-heat to a preferred temperature near the vapor liquid equilibrium temperature. In some embodiments, the preferred temperature can be that of the surrounding atmosphere such that heat can be provided without an additional energy source. Alternatively, in some further embodiments, the preferred temperature can be below ambient temperatures to provide refrigeration to another system such as a HVAC system or process refrigerator. Alternatively, in other embodiments, the preferred temperature can be above ambient temperature corresponding to the approach to the temperature of an available waste heat source.

Figure 6:
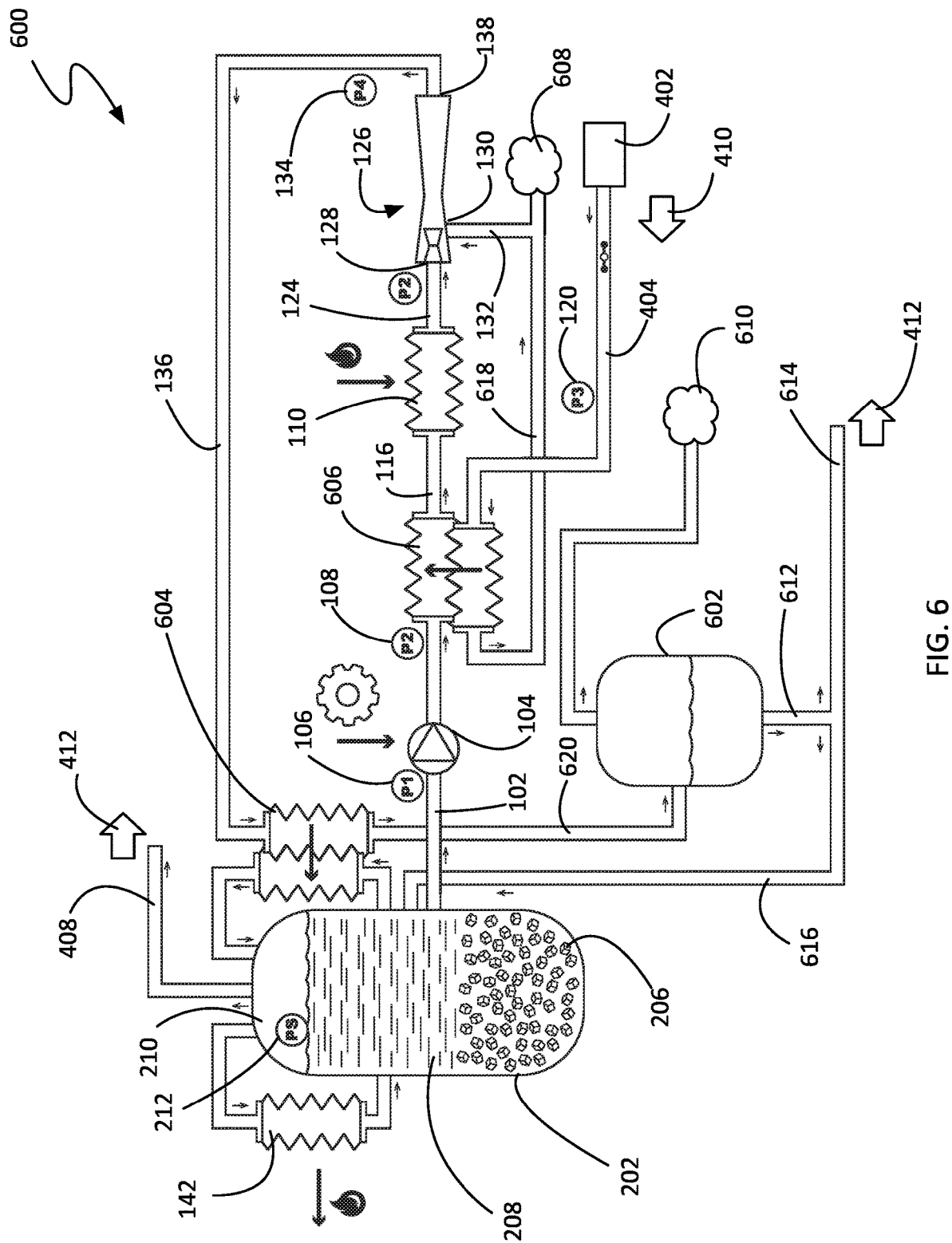

FIG. 6 is a schematic view of a non-limiting example of a system 600 to pressurize a source fluid 404. As shown, the temperature of the source fluid 404 can be partially equilibrated with the temperature of the pressurized working fluid 102 using a fourth heat exchanger 606 to transfer heat from the source fluid 404 to the pressurized working fluid 102, producing a colder source fluid (i.e. cooled source fluid 618) and a hotter pressurized working fluid. In another embodiment, as shown in FIG. 6, the fourth heat exchanger 606 can condense or freeze some low volatility components 608 of the source fluid 404, such as water, and these low-volatility components 608 can then be easily phase separated and removed.

Furthermore, according to various embodiments, output fluid 136 can be substantially condensed by third heat exchanger 604 into cooled output fluid 620. As an option, the system 600 may extract refrigeration from a $CO_2$ inventory 204 containing solid 206 and liquid 208 phases. In some embodiments, if there are non-condensable, high-volatility components 610 such as nitrogen or oxygen in the output fluid 136 made up of the source fluid 404 and the motive fluid 124, these can be easily phase separated and removed in separator 602, and the remaining portion is substantially liquid $CO_2$ as upgraded fluid 612. In some embodiments, a portion of the upgraded fluid 612 can be removed as liquid product 614. In some embodiments, the remaining portion of the upgraded fluid 612 (i.e. remaining liquid product 616) is in communication with the $CO_2$ inventory 204. In some embodiments, a portion of $CO_2$ may be removed from this inventory 204 as vapor emission stream 408 produced by converting liquid $CO_2$ to vapor and solid phases. In some embodiments, the combined mass of the emission stream 408 and liquid product 614 is equivalent to about the mass of source fluid 404.

Example 1

Figure 7:
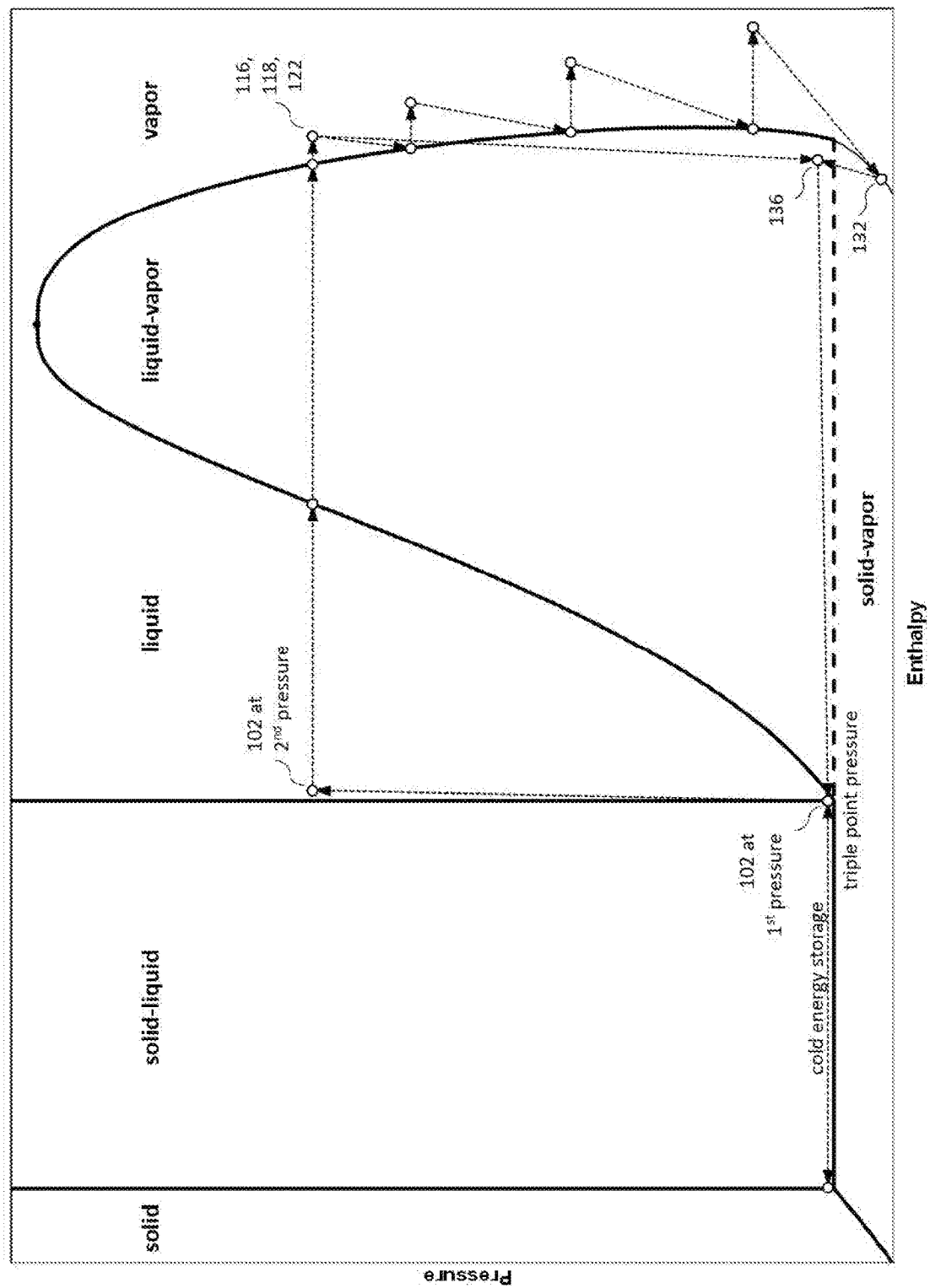
FIG. 7 is a pressure-enthalpy diagram in accordance with some embodiments.

Some embodiments include a process which provides energy on demand, for example at 15 kW, operated in a system configuration according to FIG. 3, and depicted in pressure-enthalpy diagram FIG. 7, where working fluid 102 (comprising $CO_2$ at a first pressure 106 of 520 kPa) is removed from vessel 202 at a rate of 1000 kg/h which together with the following numbers matches 15 kW size of this example. In some embodiments, this liquid can be pumped to a second pressure 108 of 5000 kPa as pressurized working fluid 102. First, in some embodiments, heat 140 is added to pressurized working fluid 102 to increase its temperature from 220° K to the saturation temperature of about 287° K so that vapor begins to form. Secondly, in some embodiments, heat 140 can continue to be added so that the fluid fully vaporizes and attains the state of a saturated vapor. Thirdly, in some embodiments, heat can continue to be added to form a superheated vapor heated working fluid 116 at 293° K. In some embodiments, a heat rate of about 92 kW can be provided to pressurized working fluid 102 to form heated working fluid 116. In some embodiments, this heat can be transferred from the ambient environment, or alternatively can be in part or in its entirety transferred from another system thereby providing useful refrigeration. In some embodiments, a 550 kg/h portion of heated working fluid 116, taken as a first portion 118 of the heated working fluid 116, is supplied to the high-pressure inlet of a turbo-expander device 112.

In some embodiments, the pressure of the first portion 118 of the heated working fluid 116 can be decreased in a series of four expansion stages 302 through turbo-expander devices 112*a-d*, while extracting mechanical work. In some embodiments, at the end of each expansion stage 302, the fluid is at or near a saturated condition in which some liquid may begin to form. In some embodiments, heat can be added in intermediate heat exchangers 314*a-c*, so that fluid supplied to each subsequent stage is in a superheated vapor state. In some embodiments, this heat can be transferred from the ambient environment. In some embodiments, fluid can be removed as an expanded working fluid 132 from turbo-expander device 112 at a third pressure 120 of 100 kPa and temperature of 195° K, near a saturated vapor state. It is noteworthy that this pressure is below the triple point pressure so that further expansion without heat addition will result in solid formation.

In some embodiments, the expanded working fluid 132 is provided to the low-pressure suction fluid port 130 of ejector device 126 at third pressure 120. Further, in some embodiments, the remaining 450 kg/h portion of the heated working fluid 116 (i.e. second portion 122) can be provided to the high-pressure motive fluid port 128 of ejector device 126. In some embodiments, the second portion 122 of the heated working fluid 116 and the expanded working fluid 132 can be combined and mixed in ejector device 126 in a nearly adiabatic manner to produce output fluid 136 at an intermediate pressure (i.e. fourth pressure 134) of 650 kPa. In some embodiments, the output fluid 136 can be in a saturated state containing both vapor and liquid phases.

In some embodiments, the output fluid 136 can be returned to vessel 202 in which it is substantially condensed to a liquid 208 phase. In some embodiments, the refrigeration for condensation of the output fluid 136 can be provided by converting some of the solid 206 phase inventory of vessel 202 to a liquid 208 phase. Asynchronously, in some embodiments, the solid 206 phase can be replenished to match the time-average requirements for condensation of the output fluid 136 by supplemental refrigeration of the vessel inventory 204 with second heat exchanger 142. In some embodiments, this refrigeration can be provided at about 217° K from an auxiliary refrigeration system. As a non-limiting example, a summary of stream conditions is provided in Table 1.

As shown in Table 2, in some embodiments, this process can produce a net power of 15 kW and 92 kW of available refrigeration, wherein the −2 kW value for pump power consumed can represent heat consumed.

temperature of the pressurized working fluid 102 from 220° K to 230° K as a heated working fluid 116. Furthermore, in some embodiments, heat can be further added to heated working fluid 116 in first heat exchanger 110 so that the fluid is fully vaporized and superheated to 293° K as a superheated motive fluid 124. In some embodiments, a heat rate of about 10 kW can be provided to heated working fluid 116 to form motive fluid 124. In some embodiments, this heat can be transferred from the ambient environment, or alternatively can be in part, or in its, entirety transferred from another system thereby providing useful refrigeration. In some embodiments, motive fluid 124 can be provided to the high-pressure motive fluid inlet 128 of ejector device 126.

In some embodiments, motive fluid 124 and the input fluid 132 can be combined and mixed in ejector device 126 in a nearly adiabatic manner to produce output fluid 136 at an intermediate fourth pressure 134 of 650 kPa. In some embodiments, output fluid 136 can be condensed by a third heat exchanger 604 from a substantially vapor phase at 650 kPa to a cooled output fluid 620 that is in a substantially liquid phase at about 520 kPa. In some embodiments, the

TABLE 1

| | stream | | | | | | |
|---|---|---|---|---|---|---|---|
| | 102 @ P1 | 102 @ P2 | 116 | 118 | 122 | 132 | 136 |
| pressure | 520 kPa | 5000 kPa | 5000 kPa | 5000 kPa | 5000 kPa | 100 kPa | 650 kPa |
| temperature | 217° K. | 220° K. | 293° K. | 293° K. | 293° K. | 195° K. | 222° K. |
| mass rate | 1000 kg/h | 1000 kg/h | 1000 kg/h | 550 kg/h | 450 kg/h | 550 kg/h | 1000 kg/h |

TABLE 2

| | |
|---|---|
| pump power consumed | −2 kW |
| turbo-expander power produced | 17 kW |
| net power produced | 15 kW |
| available refrigeration produced | 92 kW |

Example 2

In a process which upgrades a fluid comprising CO2 from a low-pressure vapor to a pressurized vapor, operated in a system configuration according to FIG. 6, in some embodiments, source fluid 404, comprising CO2 vapor, can be provided at an input rate 410 of about 40 kg/h, a third pressure 120 of about 10 kPa and a temperature of about 298° K. In some embodiments, heat can be removed in fourth heat exchanger 606 to cool the temperature to 224° K as a cooled source fluid 618, which is provided to the low-pressure suction fluid inlet 130 of ejector device 126. In some embodiments, during heat removal from the source fluid 404 to form cooled source fluid 618, some lower volatility components 608 such as water or organic compounds may be condensed or frozen, then separated. Separation may be performed continuously or intermittently.

In some embodiments of the invention, working fluid 102 can comprise CO2 at a first pressure 106 of 520 kPa that is removed from vessel 202 at a rate of 107 kg/h. In some embodiments, this liquid can be pumped to a second pressure 108 of 5000 kPa as pressurized working fluid 102. In some embodiments, heat can be transferred from source fluid 404 to the pressurized working fluid 102 to increase the refrigeration for condensation of output fluid 136 can be provided by converting some of the solid phase inventory of vessel 202 to a liquid phase. Further, in some embodiments, asynchronously, the solid phase can be replenished to match the time-average requirements for condensation of output fluid 136 by supplemental refrigeration of the vessel inventory with second heat exchanger 142. In some embodiments, this refrigeration can be provided at about 217° K from an auxiliary refrigeration system.

In some embodiments, some higher volatility components 610, such as nitrogen or oxygen, may be removed from output fluid 136. In some embodiments, the remaining liquid product 616 can be returned to vessel 202. In some embodiments, the emission stream 408 can comprise CO2 that is removed from vessel 202 as a liquid at 520 kPa and a rate of about 40 kg/h, and equivalent to the input rate 410 of source fluid 404 less the rate of removal of any lower and higher volatility components. In some embodiments, as vapor is removed from vessel 202 at about the triple point pressure, a portion of the liquid phase inventory nearly spontaneously converts to a vapor phase and a solid phase so that the pressure and volume of the vessel inventory can remain nearly constant. In some embodiments, the solid that is formed during this step can replenish a portion of the solid that is liquefied during the condensation of output fluid 136.

As a non-limiting embodiment, a summary of stream conditions is provided in Table 3. In an alternative mode of operation, some or all product can be produced as liquid product 614. In some embodiments, the mass rate of emission stream 408 is reduced by the rate of liquid product 614.

TABLE 3

| | stream | | | | | |
|---|---|---|---|---|---|---|
| | 102 @ P1 | 102 @ P2 | 116 | 124 | 618 | 136 |
| pressure | 520 kPa | 5000 kPa | 5000 kPa | 5000 kPa | 10 kPa | 650 kPa |
| temperature | 217° K. | 220° K. | 270° K. | 293° K. | 225° K. | 222° K. |
| mass rate | 107 kg/h | 107 kg/h | 107 kg/h | 107 kg/h | 40 kg/h | 147 kg/h |

| | stream | | | | |
|---|---|---|---|---|---|
| | 620 | 616 | 404 | 408 | 614 |
| pressure | 520 kPa | 520 kPa | 10 kPa | 520 kPa | — |
| temperature | 217° K. | 217° K. | 290° K. | 217° K. | — |
| mass rate | 147 kg/h | 147 kg/h | 40 kg/h | 40 kg/h | 0 kg/h |

Where the above examples, embodiments and implementations reference examples, it should be understood by those of ordinary skill in the art that other pressurization, purification, refrigeration, expansion, storage, and heating systems and methods could be intermixed or substituted with those provided. The size of the system is also only illustrative. Flow rates and input and output rates could easily be adjusted by those skilled in the art. In places where the description above refers to particular embodiments of carbon dioxide and energy storage systems and methods, it should be readily apparent that a number of modifications may be made without departing from the spirit thereof and that these embodiments and implementations may be applied to other systems and methods as well. Accordingly, the disclosed subject matter is intended to embrace all such alterations, modifications and variations that fall within the spirit and scope of the disclosure and the knowledge of one of ordinary skill in the art.

What is claimed is:

1. A method for producing work, comprising:
   increasing the pressure of a working fluid with a pressurization device, from a first pressure at least equal to a triple point pressure of the working fluid to a second pressure above the triple point pressure of the working fluid and higher than the first pressure, the working fluid comprising carbon dioxide;
   heating the working fluid with a first heat exchanger until it is substantially one of a vapor and a supercritical fluid;
   extracting mechanical work by expanding a first portion of the heated working fluid to a third pressure below the triple point pressure of the working fluid;
   supplying a second portion of the heated working fluid as a motive fluid to a high-pressure motive inlet of an ejector;
   increasing the pressure of the expanded working fluid from the third pressure to a fourth pressure while decreasing the pressure of the motive fluid to the fourth pressure by supplying the expanded working fluid to a low-pressure inlet of the ejector to combine with the motive fluid to form an output fluid at the fourth pressure, the fourth pressure at least equal to the triple point pressure of the working fluid; and
   refrigerating the output fluid received from an outlet of the ejector to condense a vapor phase portion of the output fluid into a liquid phase by exchanging heat between the output fluid from the ejector and a carbon dioxide solid, converting at least a portion of the carbon dioxide solid to at least one of a liquid phase and a vapor phase having a storage pressure at least equal to a triple point pressure of carbon dioxide.

2. The method of claim 1, wherein the output fluid from the ejector is in direct fluid communication with the carbon dioxide solid.

3. The method of claim 1, further comprising producing the carbon dioxide solid by extracting heat from at least one of a carbon dioxide liquid and a carbon dioxide vapor at a pressure at least equal to a triple point pressure of carbon dioxide, wherein the production of the carbon dioxide solid is asynchronous from the extraction of mechanical work.

4. The method of claim 1, wherein refrigerating the output fluid from the ejector is accomplished using a Stirling cooling cycle.

5. The method of claim 4, wherein a working fluid of the Stirling cooling cycle comprises carbon dioxide.

6. The method of claim 5, wherein the working fluid of the Stirling cooling cycle is in direct fluid communication with the carbon dioxide solid.

7. A system for producing work, comprising:
   a pressurization device communicatively coupled to a second heat exchanger and configured to pressurize a working fluid drawn from the second heat exchanger from a first pressure at least equal to a triple point pressure of the working fluid to a second pressure above the triple point pressure of the working fluid, the working fluid comprising carbon dioxide;
   a first heat exchanger in thermal contact with the working fluid pressurized by the pressurization device and configured to heat the working fluid until it is substantially one of a vapor and a supercritical fluid;
   an expansion device communicatively coupled to the pressurization device through the first heat exchanger to produce mechanical work by expanding a first portion of the heated working fluid from the second pressure to a third pressure below the triple point pressure of the working fluid;
   an ejector communicatively coupled to the expansion device through a low-pressure inlet of the ejector to receive the expanded working fluid at the third pressure, and also communicatively coupled to the pressurization device through a high-pressure motive inlet of the ejector to receive a second portion of the heated working fluid at the second pressure as a motive fluid, and further communicatively coupled to the second heat exchanger through an outlet of the ejector to provide an output fluid at a fourth pressure to the second heat exchanger, the fourth pressure at least equal to the triple point pressure of the working fluid and the output fluid comprising the first and second portions of the working fluid;

wherein the second heat exchanger refrigerates the output fluid to condense a vapor phase portion of the output fluid into at least a liquid phase before being supplied to the pressurization device.

8. The system of claim 7, further comprising an insulated vessel comprising a carbon dioxide supply in at least a solid phase and a liquid phase, wherein the second heat exchanger refrigerates the output fluid by exchanging heat between the output fluid from the ejector and the carbon dioxide supply of the insulated vessel, converting at least a portion of the carbon dioxide solid to at least one of a liquid phase and a vapor phase having a storage pressure at least equal to the triple point pressure of carbon dioxide.

9. The system of claim 8, wherein output fluid of the ejector is in direct fluid communication with the carbon dioxide supply of the insulated vessel.

10. The system of claim 8, further comprising a heat engine thermally coupled to the insulated vessel and configured to extract work from the carbon dioxide supply.

11. The system of claim 10, wherein the heat engine comprises the second heat exchanger.

12. A method for producing work, comprising:
increasing the pressure of a working fluid with a pressurization device, from a first pressure at least equal to a triple point pressure of the working fluid to a second pressure above the triple point pressure of the working fluid and higher than the first pressure, the working fluid comprising carbon dioxide;
heating the working fluid with a first heat exchanger until it is substantially one of a vapor and a supercritical fluid;
extracting mechanical work by expanding a first portion of the heated working fluid to a third pressure below the triple point pressure of the working fluid;
supplying a second portion of the heated working fluid as a motive fluid to a high-pressure motive inlet of an ejector;
increasing the pressure of the expanded working fluid from the third pressure to a fourth pressure while decreasing the pressure of the motive fluid to the fourth pressure by supplying the expanded working fluid to a low-pressure inlet of the ejector to combine with the motive fluid to form an output fluid at the fourth pressure, the fourth pressure at least equal to the triple point pressure of the working fluid; and
refrigerating the output fluid received from an outlet of the ejector to condense a vapor phase portion of the output fluid into a liquid phase.

13. The method of claim 12, wherein the pressurization device is a liquid pump.

14. The method of claim 12, wherein the second pressure is a pressure corresponding to a vapor-liquid equilibrium proximate an atmospheric ambient temperature, and wherein heating the working fluid is accomplished by an ambient source.

15. The method of claim 12, wherein the second pressure is a pressure corresponding to a vapor-liquid equilibrium below an atmospheric ambient temperature, and wherein heating the working fluid comprises providing refrigeration to an external source.

16. The method of claim 12, wherein the second pressure is one of a pressure corresponding to a vapor-liquid equilibrium above the atmospheric ambient temperature and a supercritical pressure, and wherein heating the working fluid comprises extracting heat from an external super-ambient temperature source.

17. The method of claim 12, wherein heating the working fluid comprises transferring heat from a water supply in a liquid phase to the working fluid, converting the water supply to a solid phase.

18. The method of claim 17, further comprising converting the water supply from a solid phase to a liquid phase by exchanging heat with an external source.

19. The method of claim 12, wherein extracting mechanical work by expanding the first portion of the heated working fluid to the third pressure comprises a plurality of expansion steps, each expansion step comprising the expansion of the first portion of the heated working fluid from a starting pressure to an ending pressure and the heating of the first portion of the heated working fluid until the first portion is substantially vapor.

20. The method of claim 12, wherein heating the working fluid comprises exchanging heat between the working fluid and the output fluid from the ejector.

* * * * *